US012217730B2

(12) United States Patent
Quinton

(10) Patent No.: US 12,217,730 B2
(45) Date of Patent: Feb. 4, 2025

(54) GENERATING TONALLY COMPATIBLE, SYNCHRONIZED NEURAL BEATS FOR DIGITAL AUDIO FILES

(71) Applicant: UNIVERSAL INTERNATIONAL MUSIC B.V., Hilversum (NL)

(72) Inventor: Elio Quinton, London (GB)

(73) Assignee: UNIVERSAL INTERNATIONAL MUSIC B.V., Hilversum (NL)

(*) Notice: Subject to any disclaimer, the term of this patent is extended or adjusted under 35 U.S.C. 154(b) by 653 days.

(21) Appl. No.: 17/507,418

(22) Filed: Oct. 21, 2021

(65) Prior Publication Data

US 2023/0128812 A1 Apr. 27, 2023

(51) Int. Cl.

*G10H 1/40* (2006.01)
*G10H 1/00* (2006.01)
*G10H 1/36* (2006.01)

(52) U.S. Cl.

CPC ............. *G10H 1/40* (2013.01); *G10H 1/0008* (2013.01); *G10H 1/366* (2013.01); *G10H 2210/325* (2013.01); *G10H 2240/325* (2013.01); *G10H 2250/015* (2013.01)

(58) Field of Classification Search

CPC ........ G10H 1/40; G10H 1/0008; G10H 1/366; G10H 2210/325; G10H 2240/325; G10H 2250/015

USPC ........................................................... 84/611

See application file for complete search history.

(56) References Cited

U.S. PATENT DOCUMENTS

2014/0128160 A1* 5/2014 Gillet ...................... A63F 13/22 463/35
2014/0309484 A1 10/2014 Chang
2014/0366710 A1* 12/2014 Eronen .................... G10H 1/00 84/609

(Continued)

FOREIGN PATENT DOCUMENTS

AU 2012200955 9/2012
CN 109621153 4/2019

(Continued)

OTHER PUBLICATIONS

International Search Report and Written Opinion dated Jan. 30, 2023 issued for International PCT Application No. PCT/EP2022/079448.

(Continued)

*Primary Examiner* — Christina M Schreiber
(74) *Attorney, Agent, or Firm* — K&L Gates LLP

(57) ABSTRACT

Methods and systems for improved neural beat generation for digital audio files are provided. In one embodiment the method is provided that includes receiving a digital audio file and a beat frequency for a neural beat. Chromagram features may be extracted from the digital audio file and may be used to identify dominant pitch classes at a plurality of timestamps within the digital audio file. A plurality of carrier frequencies at different time periods within the digital audio file may be selected based on the dominant pitch classes. A neural beat may be synthesized for the digital audio file based on the beat frequency in the plurality of carrier frequencies. The neural beat may be stored and/or may be combined with the digital audio file to generate a combined audio track, which may be stored.

21 Claims, 10 Drawing Sheets

(56) References Cited

U.S. PATENT DOCUMENTS

| | | | | |
|---|---|---|---|---|
| 2015/0094835 | A1* | 4/2015 | Eronen | G10H 1/0008 700/94 |
| 2016/0027420 | A1* | 1/2016 | Eronen | G10H 1/40 84/611 |
| 2016/0027421 | A1* | 1/2016 | Eronen | G10L 21/0208 381/66 |
| 2016/0035332 | A1* | 2/2016 | Neuhauser | G10L 19/018 700/94 |
| 2017/0173296 | A1 | 6/2017 | Park et al. | |
| 2018/0318544 | A1 | 11/2018 | Dogan | |
| 2019/0294876 | A1* | 9/2019 | Ayalon | G06F 18/24143 |
| 2020/0019371 | A1 | 1/2020 | Rando et al. | |
| 2020/0074982 | A1* | 3/2020 | McCallum | G10L 15/04 |
| 2022/0262332 | A1* | 8/2022 | Labb | G10H 1/12 |
| 2023/0121764 | A1* | 4/2023 | Wang | G06N 3/09 700/94 |
| 2023/0128812 | A1* | 4/2023 | Quinton | G10H 1/366 84/611 |

FOREIGN PATENT DOCUMENTS

| | | | | |
|---|---|---|---|---|
| KR | 20010092622 | | 10/2001 | |
| KR | 20080001573 | | 1/2008 | |
| RU | 2408397 | | 1/2011 | |
| WO | WO2013187544 | | 12/2013 | |
| WO | WO2020011958 | | 1/2020 | |
| WO | WO2020153515 | | 7/2020 | |
| WO | WO-2020220140 | A1 * | 11/2020 | G10H 1/0008 |
| WO | WO-2023040332 | A1 * | 3/2023 | G06N 3/045 |

OTHER PUBLICATIONS

Helene Papadopoulos et al., "Simultaneous estimation of chord progression and downbeats from an audio file", Acoustics, Speech and Signal Processing, 2008, IEEE International Conference on, IEEE, Piscataway, NJ, USA, Mar. 31, 2008, pp. 121-124.

App Store Preview, Binaural Beats by Adlai Holler, Designed for iPhone, downloaded on Jan. 12, 2022, https://apps.apple.com/us/app/binaural-beats/id597146594.

The LUCiD project, downloaded on Jan. 12, 2022, https://www.thelucidproject.ca/.

App Store Preview, Brain.fm—Focus Music, Brainwave Music, Improve Focus, Brain.fm, designed for iPad, downloaded Jan. 25, 2022, https://apps.apple.com/us/app/brain-fm-music-for-the-brain/id1110684238.

EOC Institute, downloaded on Jan. 25, 2022, https://eocinstitute.org/meditation/Order_Equisync/.

Brain.fm, downloaded on Jan. 25, 2022, www.brain.fm.

* cited by examiner

GENERATING TONALLY COMPATIBLE, SYNCHRONIZED NEURAL BEATS FOR DIGITAL AUDIO FILES

BACKGROUND

Certain types of beats (e.g., monaural beats, binaural beats) may be used to encourage a desired mental state (e.g., improve attention or focus of individuals). For example, such beats may be used to produce neural entrainment in a user listening to the beats, assisting the user to better focus or concentrate. Often, these beats may be provided as standalone audio tracks, such as audio tracks that just contain the beats. Alternatively audio tracks may be prepared that have had monaural or binaural beats custom added to the track (i.e., audio tracks that have been composed or generated to contain monaural or binaural beats).

SUMMARY

The present disclosure presents new and innovative systems and methods for generating and adding neural beats to existing audio tracks. In one aspect, a method is provided that includes receiving a digital audio file and a beat frequency for a neural beat to be added to the digital audio file and extracting a plurality of chromagram features of the digital audio file according to a plurality of parameters. The method may also include combining the plurality of chromagram features to form primary chromagram features of the digital audio file and extracting, from the primary chromagram features, dominant pitch classes at a plurality of timestamps within the digital audio file. A plurality of carrier frequencies for the neural beat may be selected based on the dominant pitch classes at the plurality of timestamps and a synchronized neural beat for the digital audio file may be synthesized based on the beat frequency and the plurality of carrier frequencies. The method may further include storing at least one of (i) the synchronized neural beat and (ii) a combined audio track combining the synchronized neural beat and the digital audio file.

In a second aspect according to the first aspect, the primary chromagram features include an intensity for each of a plurality of pitch classes at the plurality of timestamps. The dominant pitch classes may be selected from among the plurality of pitch classes.

In a third aspect according to the second aspect, extracting the dominant pitch classes further comprises generating, with a hidden Markov model, a probability distribution for each of the plurality of pitch classes at the plurality of timestamps based on the intensity of the plurality of pitch classes.

In a fourth aspect according to the third aspect, the hidden Markov model is configured to optimize the number and positions of transitions between dominant pitch classes.

In a fifth aspect according to any of the third and fourth aspects, extracting the dominant pitch classes further comprises identifying, within the probability distribution, a sequence of dominant pitch classes.

In a sixth aspect according to any of the first through fifth aspects, the plurality of timestamps occur every 500 milliseconds or less during the digital audio file.

In a seventh aspect according to any of the first through sixth aspects, the plurality of chromagram features are linearly combined to form the primary chromagram features.

In an eighth aspect according to any of the first through seventh aspect, the method further includes adjusting a volume of the synchronized neural beat to follow the volume of the digital audio file over time.

In a ninth aspect according to the eighth aspect, normalizing the volume of the synchronized neural beat includes generating a loudness profile for the duration of the digital audio file and forming, based on the loudness profile, a volume curve. The method may also include adjusting the volume of the synchronized neural beat according to the volume curve.

In a tenth aspect according to any of the first through ninth aspects, the method further includes aligning the beat frequency with a rhythmic beat within the digital audio file.

In an eleventh aspect according to the tenth aspect, aligning the beat frequency includes estimating positions of rhythmic beats within the digital audio file, estimating the musical tempo within the digital audio file, and adjusting timing for the synchronized neural beat to align peak values within the synchronized neural beat with the positions of rhythmic beats within the digital audio file according to the musical tempo.

In a twelfth aspect according to any of the first through eleventh aspects, the neural beat is at least one of (i) a binaural beat and (ii) a monaural beat.

In a thirteenth aspect according to any of the first through twelfth aspects, the synchronized neural beat includes two or fewer audio channels.

In a fourteenth aspect according to any of the first through thirteenth aspects, the synchronized neural beat includes three or more audio channels.

In a fifteenth aspect according to any of the first through fourteenth aspects, the beat frequency is greater than or equal to 0.5 Hz and less than or equal to 150 Hz.

In a sixteenth aspect according to any of the first through fifteenth aspects, the method further includes playing, via a computing device, the synchronized neural beat and the digital audio file in parallel.

In a seventeenth aspect according to the sixteenth aspect, the method further includes streaming, to the computing device, the synchronized neural beat and the digital audio file for playback by the computing device.

In an eighteenth aspect, a system is provided that includes a processor and a memory. The memory may store instructions which, when executed by the processor, cause the processor to receive a digital audio file and a beat frequency for a neural beat to be added to the digital audio file and extract a plurality of chromagram features of the digital audio file according to a plurality of parameters. The instructions may also cause the processor to combine the plurality of chromagram features to form primary chromagram features of the digital audio file, extract, from the primary chromagram features, dominant pitch classes at a plurality of timestamps within the digital audio file, and select, based on the dominant pitch classes at the plurality of timestamps, a plurality of carrier frequencies for the neural beat. The instructions may further cause the processor to synthesize, based on the beat frequency and the plurality of carrier frequencies, a synchronized neural beat for the digital audio file and store at least one of (i) the synchronized neural beat and (ii) a combined audio track combining the synchronized neural beat and the digital audio file.

In a nineteenth aspect according to the eighteenth aspect, the primary chromagram features include an intensity for each of a plurality of pitch classes at the plurality of timestamps. The dominant pitch classes may be selected from among the plurality of pitch classes.

In a twentieth aspect according to the nineteenth aspect, the memory stores further instructions which, when executed by the processor while extracting the dominant pitch classes, cause the processor to generate, with a hidden Markov model, a probability distribution for each of the plurality of pitch classes at the plurality of timestamps based on the intensity of the plurality of pitch classes.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

Figure 1A:
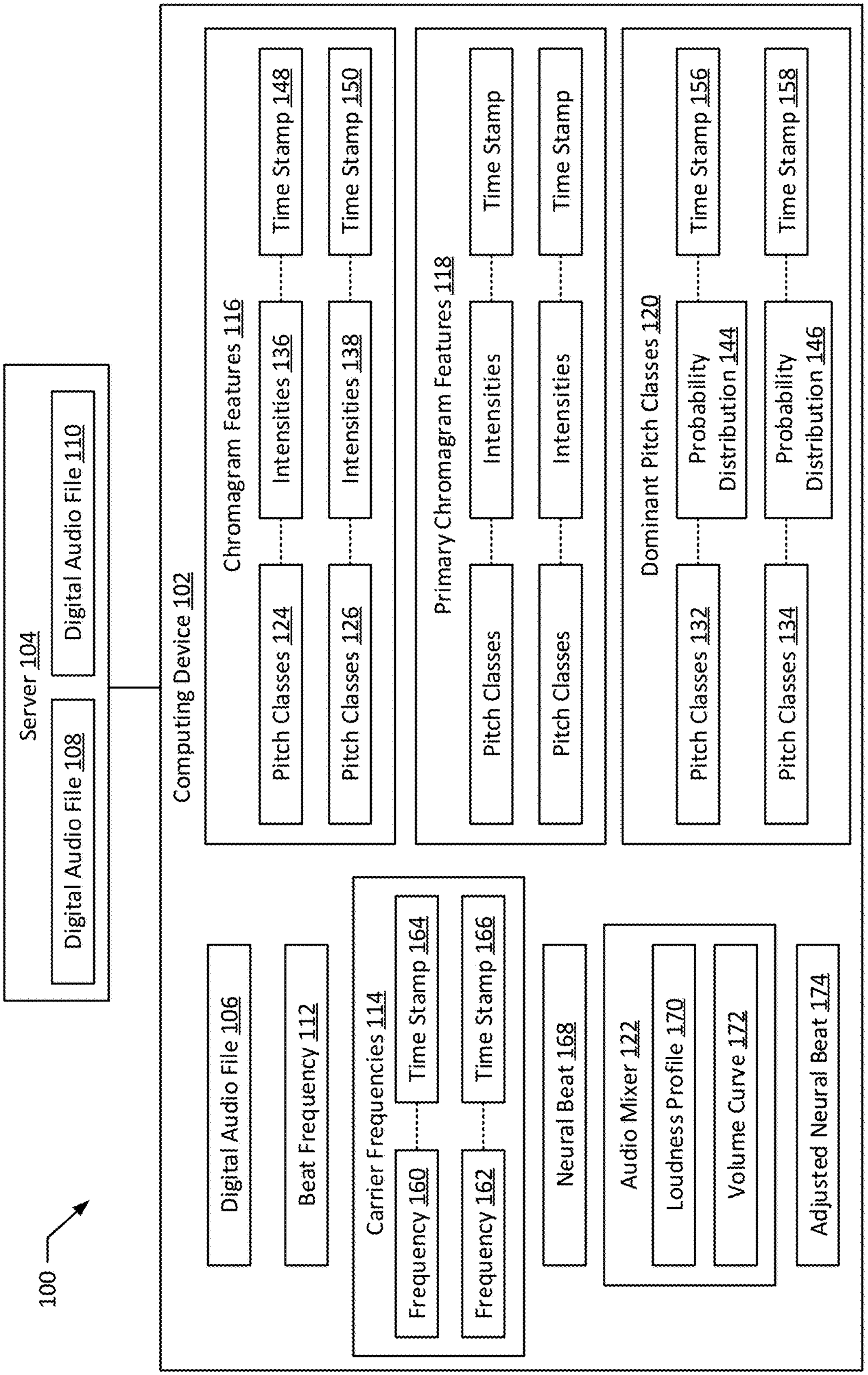
FIG. 1A illustrates a system according to an exemplary embodiment of the present disclosure.

"Neural beats" may include any audio beat designed to produce or encourage a desired mental state in a user. Desired mental states may include neural entrainment, improved focus, a calmer mood, relaxation, or any other desired mental state. In certain implementations, neural beats may include monaural or binaural beats that combine a lower beat frequency with a higher carrier frequency. In particular, the "beat frequency" may be selected based on a desired mental state (e.g., where different frequencies foster different types of mental states in individuals). In certain implementations, the beat frequency may range from 0.5 to 150 Hz. The "carrier frequency" may be an audio frequency or note selected to carry or audibly reproduce the beat frequency within an audio track. For example, the beat frequency may be at a lower frequency than humans can detect and/or may be at the lower range of human hearing. Therefore, to maximize the effectiveness for the neural beat, a carrier frequency may be selected and the beat frequency may be modulated onto the carrier frequency to form the neural beat. The carrier frequency may range from 207.65 to 392.00 Hz. In various implementations, neural beats may have different numbers of audio channels, such as one audio channel (e.g., monaural beats), two audio channels (e.g., binaural beats), five audio channels, or more.

Not all users enjoy listening to audio tracks that only contain neural beats, and may find them boring or distracting, limiting the effects of neural entrainment. Furthermore, the limited availability of existing audio tracks that include embedded monaural beats may not appeal to all users. Certain systems may automatically generate music that incorporates monaural beats to prevent users from having to listen to the same track multiple times. However, such systems still cannot correct for the possibility that a user will want to listen to a specific track or genre that has not been previously combined with neural beats. Therefore, there exists a need to automatically add neural beats to existing audio tracks such that users may listen to their preferred tracks or music genres while also experiencing the benefits of neural entrainment, relaxation, and/or improved focus provided by neural beats.

One solution to this problem is to analyze the pitch characteristics of a digital audio file over time. In particular, chromagram features may be generated for the digital audio file indicating the strength of different pitch classes over time within the digital audio file. This information may then be used to select a carrier frequency for a neural beat to be added to the digital audio file. For example, dominant pitch classes may be extracted from the chromagram features at various timestamps within the digital audio file and the dominant pitch classes may be used to select carrier frequencies for the neural beat at the various timestamps. In certain instances, the dominant pitch classes may be analyzed with a model (e.g., a hidden Markov model) to select the carrier frequencies to optimize the number of changes in carrier frequency. The neural beat may then be synthesized based on the beat frequency and the selected carrier frequencies and stored for later use. In certain instances, a combined audio track may be generated that combines the digital audio file with the neural beat. In other instances, the neural beat may be stored in association with the digital audio file. Furthermore, in certain instances, the neural beat and/or combined audio track may be generated in real time as a user device streams the digital audio file, such as by a server from which the digital audio file is streamed or by a user device receiving the streamed digital audio file. The neural beat may then be played alongside the digital audio file (e.g., as separate audio files played simultaneously and/or as a single audio file) via the user device.

FIG. 1A illustrates a system 100 according to an exemplary embodiment of the present disclosure. The system 100 may be configured to generate and synchronize neural beats for addition to digital audio files. The system 100 includes a computing device 102 and a server 104. The server 104 stores digital audio files 108, 110 to which neural beats may be added by the computing device 102. For example, the computing device 102 and the server 104 may be part of a digital audio streaming platform configured to stream digital audio files 106, 108, 110 at a user's request. Furthermore, the computing device 102 may be configured to add neural beats 168, 174 to digital audio files 106, 108, 110 at a user's request. For example, the user may manipulate a preference for adding neural beats 168, 174 to streamed audio files received from the audio streaming platform.

The computing device 102 may receive a digital audio file 106 from the server 104 and may generate a neural beat 168 and/or an adjusted neural beat 174 to be added to the digital audio file 106. The computing device 102 may also receive a beat frequency 112 for the neural beat 168, 174. The beat frequency 112 received from a user, such as via a user-configurable beat frequency setting. The neural beat 168, 174 may be a monaural beat, a binaural beat, or may have more audio channels, and the type of neural beat 168, 174 may be selected by a user. Additionally or alternatively, the computing device 102 may select between a monaural beat and a binaural beat based on the audio device from which the user is streaming digital audio files. For example, if a user is streaming audio from a mono audio device, the computing device 102 may generate a monaural neural beat and if the user is streaming audio from a stereo audio device (e.g., stereo speakers, stereo headphones), the computing device 102 may generate a binaural neural beat. In still further implementations, the computing device 102 may select the number of audio channels based to be the same as the number of audio channels in the digital audio file 106.

The computing device 102 in particular may be configured to generate a neural beat 168, 174 that blends into the digital audio file 106. For example, the computing device 102 may be configured to generate a neural beat 168, 174 that synchronizes with audio pitches within the digital audio file 106 to avoid noticeable and distracting differences in pitch, which may impede the user's neural entrainment. To do so, the computing device 102 may extract a plurality of chromagram features 116 from the digital audio file 106. The chromagram features 116 may include pitch classes 124, 126 and associated intensities 136, 138 at multiple timestamps 148, 150.

Figure 2:
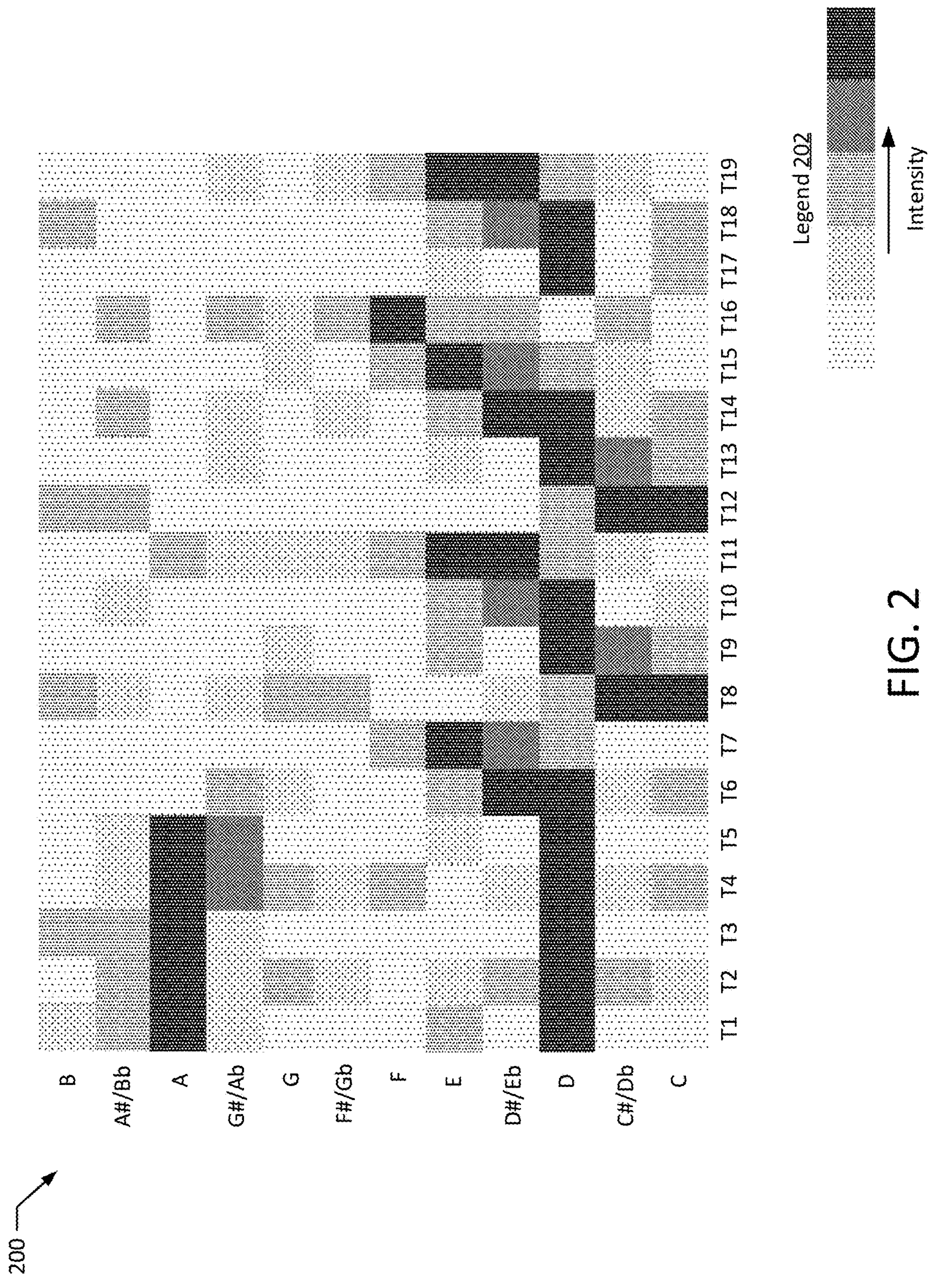
FIG. 2 illustrates chromagram features according to an exemplary embodiment of the present disclosure.

For example, FIG. 2 depicts chromagram features 200 according to an exemplary embodiment of the present disclosure. The chromagram features 200 include the intensities (as defined in the legend 202) for multiple pitch classes at multiple timestamps T1-T19. The pitch classes include B, A sharp/B flat, A, G sharp/A flat, G, F sharp/G flat, F, E, D sharp/E flat, D, C sharp/D flat, and C, which represent each of the types of notes that may be reproduced within a digital audio file 106. In particular, each pitch class may represent all audible pitches in a song that are separated by a whole number of octaves. For example, the pitch class C may contain middle C, treble C, high C, tenor C, low C, and other octaves of the note C. Other pitch classes may similarly be defined to contain multiple notes at different octaves. In practice, the pitch classes may be defined as a collection of frequency bands. For example, the pitch class C may be defined as 261.626±0.1 Hz (for middle C), 523.251±0.1 Hz (for tenor C), and similarly for the other notes contained within the pitch class. As depicted, certain sharp or flat notes (e.g., A sharp, B flat, G sharp, A flat, F sharp, G flat, D sharp, E flat, C sharp, D flat) are grouped into separate pitch classes from the pitch classes containing natural notes A-G. In additional or alternate implementations, the pitch classes may be defined to contain sharp or flat versions of the notes. Similarly, certain implementations may define the pitch classes differently (e.g., to contain any desired combination of notes). For example, the pitch class for C may contain middle C sharp or middle C flat in an alternative implementation. It should be appreciated by one skilled in the art that the chromagram features 200 may be calculated according to any of a plurality of conceivable pitch classes, such as an equal temperament tuning (e.g., a 24 tone equal temperament with 24 pitch classes, a 19 tone equal temperament with 19 pitch classes, and/or a 7 tone equal temperament with 7 pitch classes). In practice, a computing device 102 may calculate more pitch classes than are represented in the chromagram features 200 and may combine this pitch classes into the desired pitch classes for the chromagram features 200. For example, a computing device 102 may calculate 36 pitch classes that are then combined into the pitch classes depicted for the chromagram features 200.

The chromagram features 200 include intensities for each pitch class at each of the timestamps T1-T19. These intensities change over time (e.g., as the music changes in the digital audio file 106). For example, the pitch classes A and D both have high intensities from times T1-T5. From times T6-T10, the pitch class with the highest intensity alternates between C and C sharp/D flat (T8, T12), D (T9-10, T13, T17-18), D and D sharp/E flat (T6, T14), E (T7, T15), E and D sharp/E flat (T11, T19), and F (T16). These intensities may be calculated based on an analysis of the frequency domain of the digital audio file 106 at each of the timestamps T1-T19. For example, the computing device 102 may divide the digital audio file 106 into segments for each of the timestamps T1-T19. The computing device 102 may then compute a time-frequency representation (e.g., frequency distributions at multiple times) for each of the segments, (e.g., by performing a Fourier transform, a fast Fourier transform (FFT), a Constant-Q transform, a wavelets transform, using a filter bank, and the like). Frequencies in the time-frequency representation may correspond to or be categorized into each of the pitch classes (e.g., according to predefined frequency bands). The intensity for each of the pitch classes may then be calculated based on the intensity of the corresponding frequencies within the time-frequency representation. This process may be repeated multiple times for the segments corresponding to each of the timestamps T1-19. In certain implementations, the timestamps T1-19 may occur every 50 milliseconds. In additional or alternative implementations, the timestamps T1-19 may occur more frequently (e.g., every 10 milliseconds, every 5 milliseconds, every millisecond) and/or less frequently (e.g., every 0.5 seconds, every 0.25 seconds, 0.1 seconds). In certain implementations, rather than performing a frequency domain analysis of the digital audio file 106, the computing device 102 may perform an analysis in the time domain. For example, a filter bank may be used with one or more filters for each pitch class. An intensity for the resulting, filtered signal at each timestamp may then be used to determine the intensities for the chromagram features 200.

Returning to FIG. 1A, the computing device 102 may compute multiple chromagram features 116 for the digital audio file 106. For example, multiple chromagram features 116 may be calculated to focus on different frequency ranges within the digital audio file 106. As one specific example, a first set of chromagram features may be calculated focusing on a lower frequency range within the digital audio file 106 (e.g., less than C4, or 261.62 Hz) and a second set of chromagram features may be calculated focusing on a higher frequency range (e.g., C1 to C8, or 32.70 Hz to 4186.01 Hz). In such instances, the computing device 102 may then be configured to combine multiple chromagram features 116 into a set of primary chromagram features 118 for the digital audio file 106. For example, the computing device 102 may linearly combine the chromagram features 116 (e.g., according to predefined weights) to form the primary chromagram features 118. The data structure for the primary chromagram features 118 may be comparable to that of the chromagram features 116. For example, in certain implementations, the chromagram features 200 may represent a set of primary chromagram features 118 for the digital audio file 106. Furthermore, it should be understood that, although FIG. 2 depicts the chromagram features 200 as a plot of data over time, in practice, the chromagram features 116 and/or primary chromagram features 118 may be stored in additional or alternative data structures. For example, the chromagram features 116 and/or the primary chromagram features 118 may be stored as an array containing the intensity values for the pitch classes at the timestamps T1-19.

Figure 3:
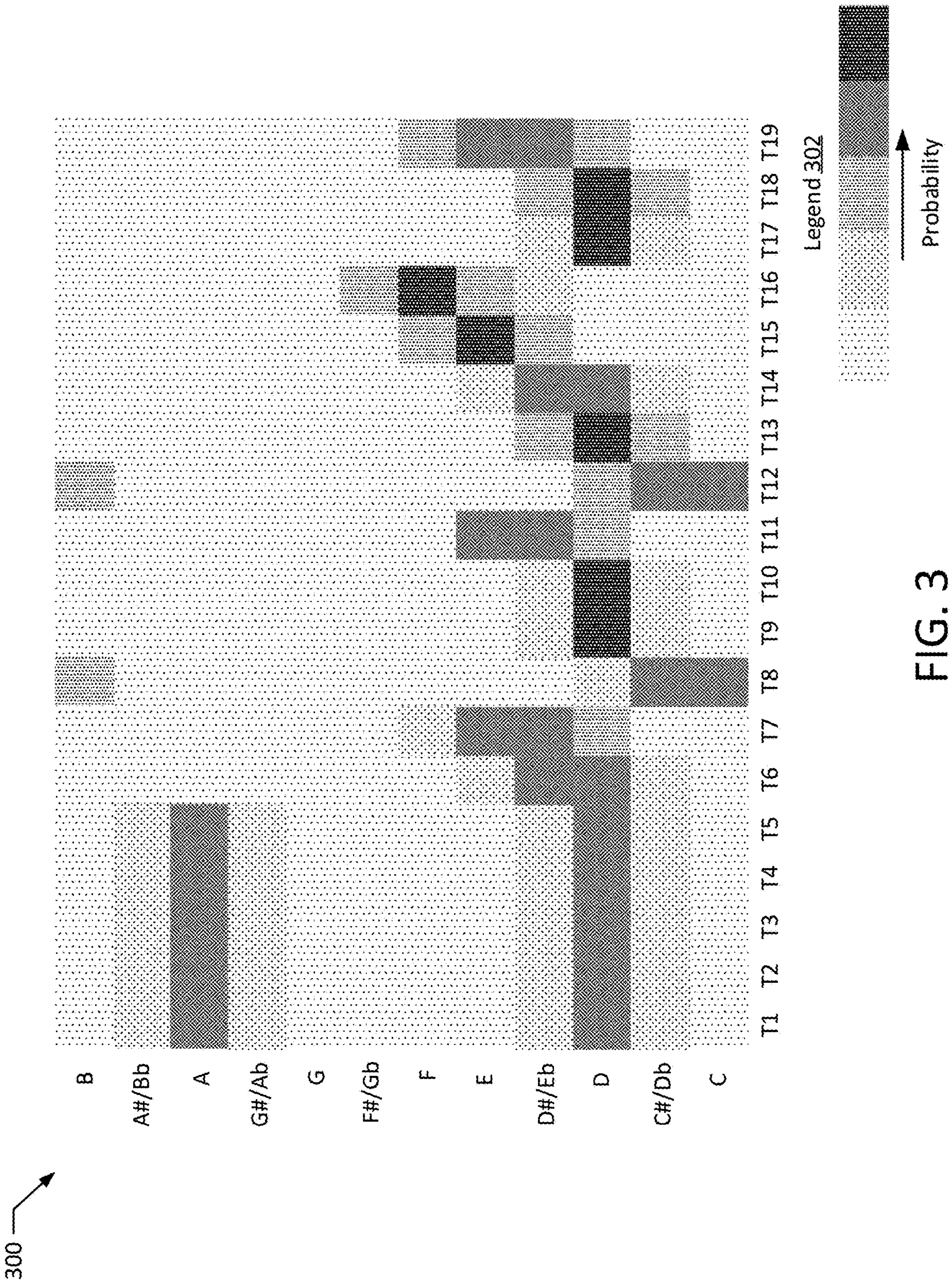
FIG. 3 illustrates dominant pitch classes according to an exemplary embodiment of the present disclosure.

The computing device 102 may identify dominant pitch classes 120 based on the primary chromagram features 118. In particular, the computing device 102 may calculate a probability distribution 144, 146 that each of the pitch classes 132, 134 of the dominant pitch class for a particular timestamps 156, 158. For example, FIG. 3 illustrates dominant pitch classes 300 according to an exemplary embodiment of the present disclosure. The dominant pitch classes 300 include a probability (as defined in the legend 302) for each of the pitch classes B, A sharp/B flat, A, G sharp/A flat, G, F sharp/G flat, F, E, D sharp/E flat, D, C sharp/D flat, C at each of the timestamps T1-19. In particular, at times T1-T5, the pitch classes A and D have medium-high probabilities, at times T6 and T14, the pitch classes D and D sharp/E flat have medium-high probabilities, at times T7, T11, and T19, the pitch classes E and D sharp/E flat have medium-high probabilities, at times T8 and T12, the pitch classes C and C sharp/D flat have medium-high probabilities, at times T9, T10, T13, T17, and T18, has a high probability, at time T15 the pitch class E has a high probability, and at time T16, the pitch class F has a high probability. The probabilities may be calculated to reflect a probability that each pitch class represents the dominant pitch class at the given point in time. For example, in certain instances, the probabilities may be calculated by a Hidden Markov Model (HMM). In certain instances, the HMM may be tuned to optimize the number of transitions in dominant pitch class (e.g., to optimize the number of changes in carrier frequency for the neural beat 168, 174), which a user may find distracting and/or which may adversely affect neural entrainment.

Figure 4:
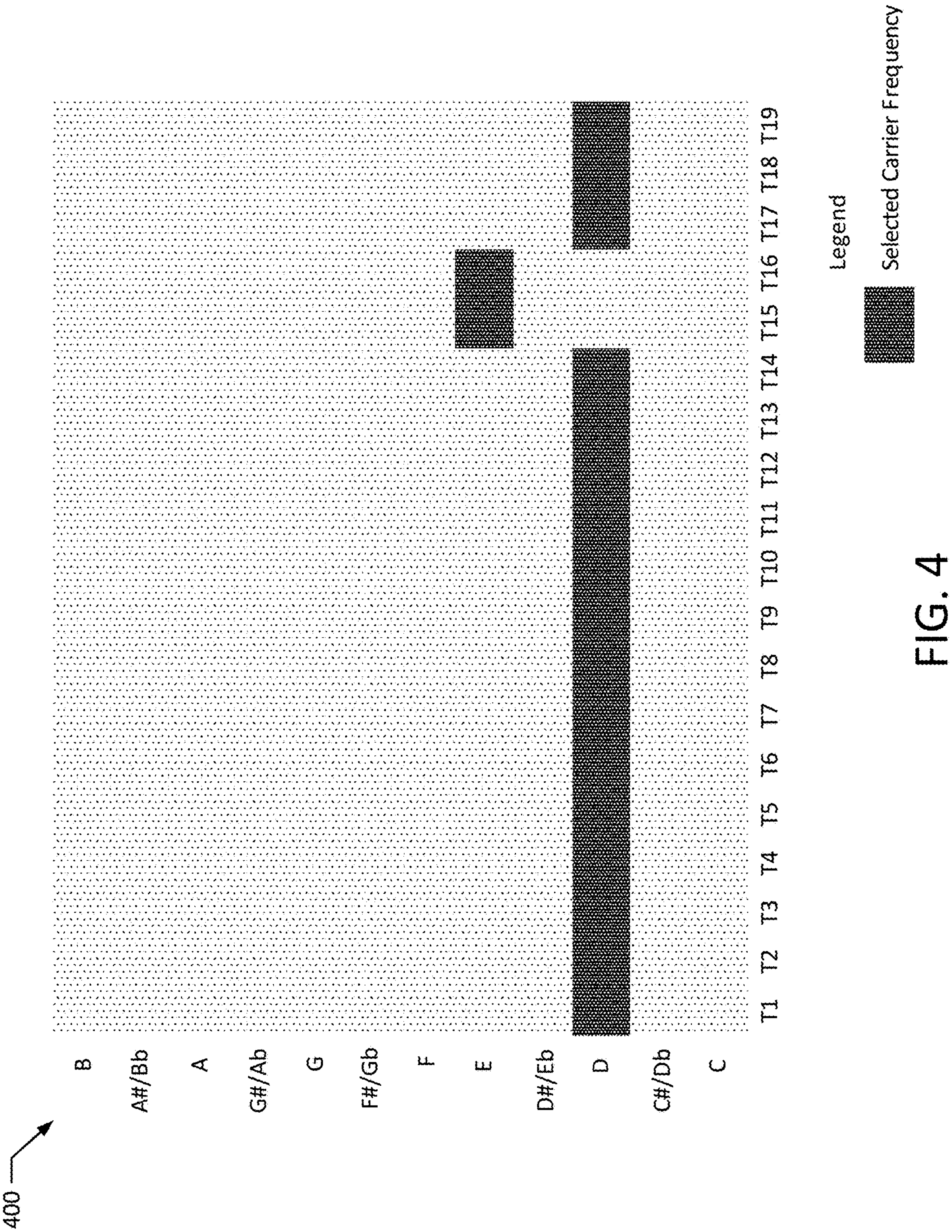
FIG. 4 illustrates selected carrier frequencies according to an exemplary embodiment of the present disclosure.

Returning to FIG. 1A, the computing device 102 may then determine carrier frequencies 114 based on the dominant pitch classes 120. The carrier frequencies 114 may include a single, selected frequency 160, 162 at each timestamp 164, 166 to serve as the carrier frequency at that time within the neural beat 168, 174. For example, FIG. 4 depicts carrier frequencies 400 according to an exemplary embodiment of the present disclosure. The carrier frequencies 400 include a single selected pitch class at each timestamp T1-19. In particular, the pitch class D is selected as the carrier frequency for timestamps T1-14 and T17-19 and the pitch class E is selected for timestamps T15-16. The carrier frequencies may be selected to follow the musical harmonies of the digital audio file while also avoiding unnecessary changes in carrier frequency. In particular, the carrier frequency at times T9-T10 and T17-20 may be selected as pitch class D to align with the dominant pitch class at these times. However, excessive changes in carrier frequency may be distracting to a user, so the selected carrier frequencies may be selected to maintain consistency over time in certain instances, such as when selecting between different pitch classes with similar probabilities or small, brief changes in the dominant pitch class. For example, in the dominant pitch classes 300, the pitch classes A and D had similar probabilities at times T1-5. However, the pitch class D may be selected as the carrier frequency from times T1-5 to avoid a transition from the pitch class A to the pitch class D at time T6, where the pitch class D is dominant. As another example, at times T7, T11, T19, the pitch classes D sharp/E flat and E both have similar probabilities. However, the pitch class D may be selected as the carrier frequency, even though it does not have the highest probability at these times, to reduce the number of changes in carrier frequency (e.g., because the pitch class D still has a medium probability in the dominant pitch classes 300). On the other hand, failing to follow musical harmonies may also adversely affect neural entrainment. Thus, at times T17-T19, the carrier frequency switches from E (at time T16) to D (at times T17-T19) to properly follow the harmonies in the digital audio file.

To select the carrier frequencies 400, the computing device 102 may be configured to balance maximizing the overall probability of selected carrier frequencies while limiting the number of changes in consecutive dominant pitch classes. In certain implementations, the computing device 102 may perform a Viterbi decoding on the dominant pitch classes 300 to find the most likely sequence of individual pitch classes at each timestamp that constrains the number of carrier frequency transitions while also ensuring that the carrier frequencies 400 align musically with the digital audio file 106.

Returning to FIG. 1A, the computing device may then synthesize the neural beat 168 based on the beat frequencies 112 and the carrier frequencies 114. In particular, the computing device 102 may synthesize the neural beat 168 by modulating the beat frequency 112 onto the selected carrier frequencies 160, 162 at each of the timestamps 164, 166. In certain implementations, the timestamps 164, 166 within the carrier frequencies (e.g., timestamps T1-19) may correspond to timestamps for audio data within the digital audio file 106. In such instances, the computing device 102 may synthesize the neural beat 168 directly based on the carrier frequencies at each of the timestamps 164, 166.

In certain implementations, the computing device 102 may further adjust one or more aspects of the neural beat 168 based on further characteristics of the digital audio file 106. For example, the computing device 102 may adjust a volume of the neural beat 168 to align with changes in volume for the digital audio file 106. In particular, if the neural beat 168 is relatively quiet compared to the digital audio file 106, the benefits of the neural beat may be diminished. Additionally or alternatively, where the neural beat 168 is loud relative to the digital audio file 106, the neural beat 168 may prove disruptive or distracting for the user, interrupting the benefits provided by the neural beat 168. Accordingly, an audio mixer 122 may be used to adjust the volume of the neural beat 168 over the course of the digital audio file 106.

Figure 5:
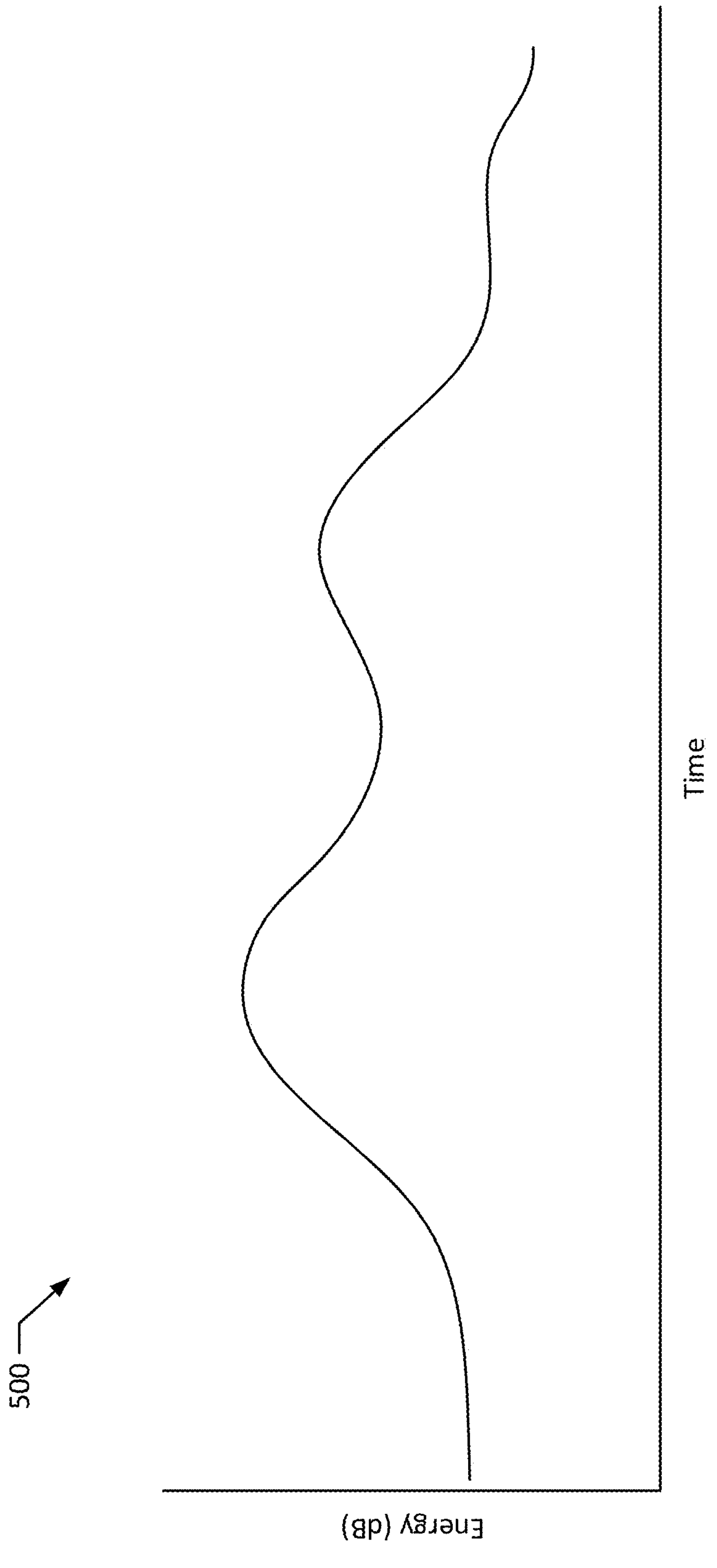
FIG. 5 illustrates a volume curve according to an exemplary embodiment of the present disclosure.

In particular, the audio mixer 122 may determine a loudness profile 170 of the digital audio file 106. The loudness profile 170 may be a representation of how loud the digital audio file 106 is over time (e.g., throughout the duration of the digital audio file 106). The loudness profile 170 may be computed as a combined intensity (e.g., across audible frequencies) at multiple timestamps within the digital audio file 106. The loudness profile 170 may then be used to generate a volume curve 172 for the neural beat 168. In particular, the loudness profile 170 may be offset (e.g., according to a maximum desired intensity for the neural beat 168) to generate the volume curve 172. For example, FIG. 5 depicts a volume curve 500 according to an exemplary embodiment of the present disclosure. The volume curve 500 shows changes in energy (in dB) over the duration of a digital audio file 106, where the energy of the audio signals within the digital audio file 106 may be used as a proxy for volume over time within the digital audio file 106. Returning to FIG. 1A, the volume curve 172 may be applied to the neural beat 168 to generate an adjusted neural beat 174. In particular, applying the volume curve 172 to the neural beat 168 may include increasing or decreasing the volume (e.g., the intensity) of the neural beat 168 at different points in time according to the intensities indicated in the volume curve 172 (e.g., so that the adjusted neural beat 174 is louder at times of high intensity in the volume curve 172 and quieter at times of low intensity in the volume curve 172).

Figure 1B:
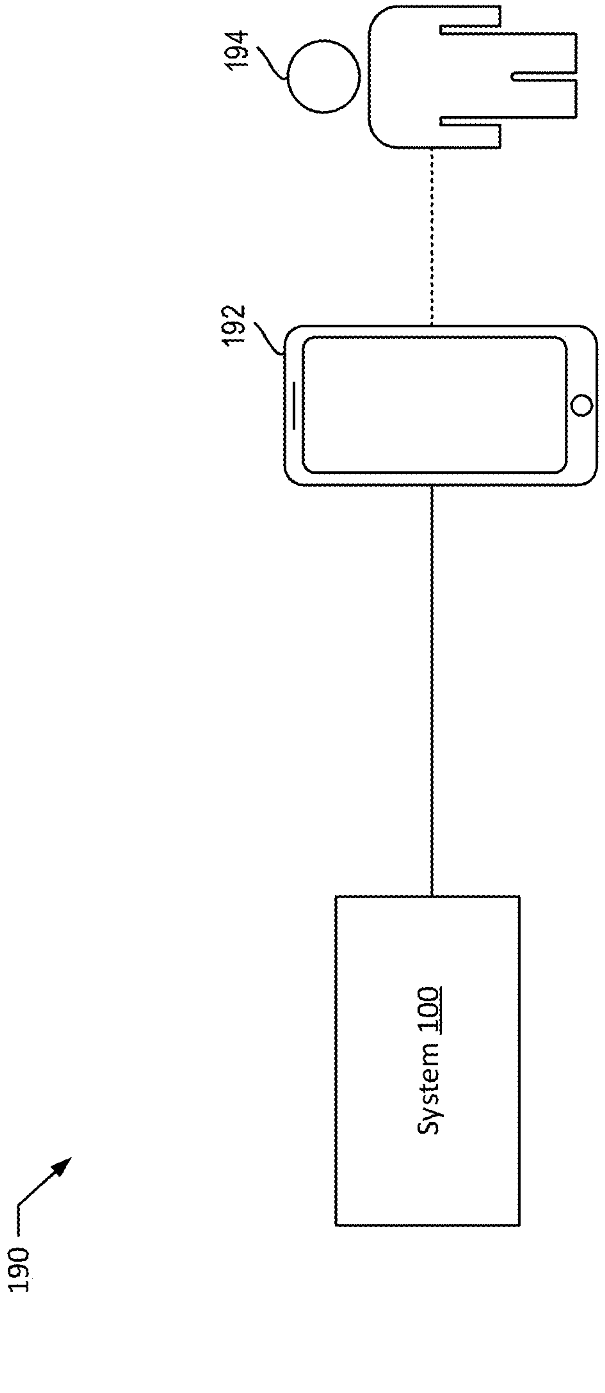
FIG. 1B illustrates a system for audio playback according to an exemplary embodiment of the present disclosure.

The neural beat 168 and/or the adjusted neural beat 174 may then be stored, transmitted, and/or played back on a user's device. For example, the computing device 102 may store the neural beat 168 and/or the adjusted neural beat 174 in association with the digital audio file 106 (e.g., in the server 104). In certain implementations, the digital audio file 106 and the neural beat 168 and/or adjusted neural beat 174 may be stored separately. In additional or alternative implementations, the computing device 102 may combine the digital audio file 106 with the neural beat 168 and/or adjusted neural beat 174 to generate a combined audio track that may be stored (e.g., in the server 104). As another example, and referring to FIG. 1B and the system 190, the digital audio file 106 and the neural beat 168 and/or adjusted neural beat 174 may be transmitted to a user device 192 associated with a user 194. The user device 162 may include a smartphone, tablet computer, wearable computing device, laptop, personal computer, or any other personal computing device. The user device 192 may also include one or more audio devices for audio playback, such as a speaker, a 3.5 mm audio jack connected to headphones or a speaker, wirelessly-connected headphones, wirelessly-connected speaker(s), or any other device capable of audio playback. The system 100 may transmit (e.g., stream) the digital audio file 106 and the neural beat 168 and/or adjusted neural beat 174 to the user device 192. The user device 192 may then receive and play back the digital audio file 106 at the same time as the neural beat 168 and/or adjusted neural beat 174. Additionally or alternatively, the user device 192 may store the digital audio file 106 and the neural beat 168 and/or adjusted neural beat 174 for future playback. Additionally or alternatively, the computing device 102 may transmit a combined audio track to the user device 192. In still further implementations, the neural beat 168 and/or the adjusted neural beat 174 may be generated on the user device 192. In such instances, the neural beat 168 and/or the adjusted neural beat 174 may be played along with the digital audio file 106 on the user device 192 (e.g., as separate audio files, as a combined audio track) and/or may be stored on the user device 192 for future playback at a later time.

Although not depicted, the computing device 102, the server 104, and/or the user device 192 may contain at least one processor and/or memory configured to implement one or more aspects of the computing device 102, the server 104, and/or the user device 192. For example, the memory may store instructions which, when executed by the processor, may cause the processor to perform one or more operational features of the computing device 102, the server 104, and/or the user device 192. The processor may be implemented as one or more central processing units (CPUs), field programmable gate arrays (FPGAs), and/or graphics processing units (GPUs) configured to execute instructions stored on the memory. Additionally, the computing device 102, the server 104, and/or the user device 192 may be configured to communicate using a network. For example, the computing device 102, the server 104, and/or the user device 192 may communicate with the network using one or more wired network interfaces (e.g., Ethernet interfaces) and/or wireless network interfaces (e.g., Wi-Fi®, Bluetooth®, and/or cellular data interfaces). In certain instances, the network may be implemented as a local network (e.g., a local area network), a virtual private network, L1 and/or a global network (e.g., the Internet).

In certain implementations, the computing device 102 and the server 104 may be implemented as a single computing device. For example, the computing device 102 may store the digital audio files 106, 108, 110 (e.g., in a local database). In further implementations, the computing device 102 and/or the server 104 may be at least partially implemented by the user device 162. In still further implementations, the computing device 102, the server 104, and/or the user device 192 may be implemented by multiple computing devices. For example, the computing device 102 may be implemented as multiple software services executing in a distributed computing environment (e.g., a cloud computing environment). As another example, the user device 162 may be implemented by multiple personal computing devices (e.g., a smartphone and a wearable computing device such as a smartwatch).

Figure 6:
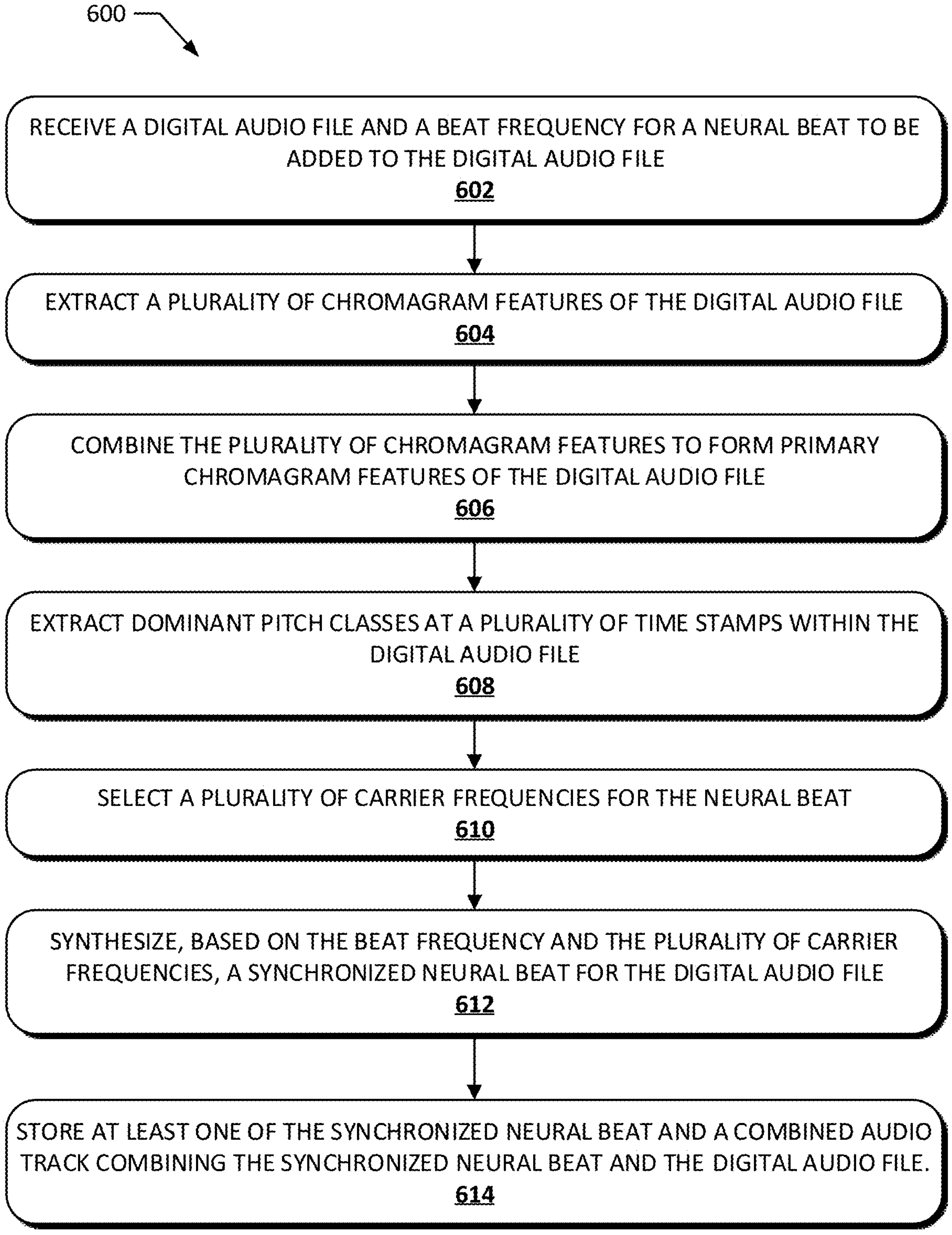
FIG. 6 illustrates a method for synthesizing a neural beat according to an exemplary embodiment of the present disclosure.

FIG. 6 illustrates a method 600 for synthesizing a neural beat according to an exemplary embodiment of the present disclosure. The method 600 may be implemented on a computer system, such as the systems 100, 160. For example, the method 600 may be implemented by the computing device 102 and/or the user device 192. The method 600 may also be implemented by a set of instructions stored on a computer readable medium that, when executed by a processor, cause the computer system to perform the method 600. For example, all or part of the method 600 may be implemented by a processor and/or a memory of the computing device 102 and/or the user device 192. Although the examples below are described with reference to the flowchart illustrated in FIG. 6, many other methods of performing the acts associated with FIG. 6 may be used. For example, the order of some of the blocks may be changed, certain blocks may be combined with other blocks, one or more of the blocks may be repeated, and some of the blocks described may be optional.

The method 600 may begin with receiving a digital audio file and a beat frequency for a neural beat to be added to the digital audio file (block 602). For example, the computing device 102 may receive a digital audio file 106 and a beat frequency 112 fora neural beat to be added to the digital audio file 106. As explained above, the computing device 102 may receive the digital audio file 106 from a server 104 and/or may retrieve the digital audio file 106 from a local storage. In certain implementations, the digital audio file 106 may be received according to a user request. For example, a user request may be received from a user device to play back a particular song (e.g., via a music streaming service). The computing device 102 may receive the beat frequency 112 from a user (e.g., according to a user request and/or a previously-defined user setting). In certain implementations, the beat frequency 112 may specify a particular frequency (e.g., 3 Hz) for the neural beat to be added to the digital audio file 106. In additional or alternative implementations, the beat frequency 112 may specify a range of frequencies (e.g., 4-8 Hz) for the neural beat.

A plurality of chromagram features may be extracted from the digital audio file (block 604). For example, the computing device 102 may extract a plurality of chromagram features 116, 200 from the digital audio file 106. As explained above, the chromagram features may include intensity information for multiple pitch classes at multiple timestamps within the digital audio file 106. In certain implementations, each of the plurality of chromagram features may be extracted according to different parameters applied to the digital audio file 106 prior to extracting the chromagram features 116, 200. For example, first chromagram features may be extracted focusing on the lower frequencies of the digital audio file 106 and second chromagram features may be extracted focusing on higher frequencies of the digital audio file 106. As another example, three chromagram features may be extracted from the digital audio file 106: first chromagram features focusing on lower frequencies (e.g., less than 200 Hz), second chromagram features focusing on mid-level frequencies (e.g., from 200

Hz-800 Hz), and third chromagram features focusing on higher frequencies (e.g., greater than 800 Hz). In practice, the plurality of chromagram features 116, 200 may be generated by selecting octaves and intensities within the desired frequency ranges for inclusion in the chromagram features 116, 200 after generating the time-frequency representation as discussed above. In other implementations, the plurality of chromagram features may be generated by applying a filter (e.g., a high-pass filter, a low-pass filter, a bandpass filter, and the like) to the digital audio file 106 prior to extracting the chromagram features 116, 200 (e.g., using an FFT, a constant-Q transform, filter buckets and/or other techniques, as discussed above).

The plurality of chromagram features may be combined to form primary chromagram features of the digital audio file (block 606). For example, the computing device 102 may combine the plurality of chromagram features 116, 200 to form primary chromagram features 118 of the digital audio file 106. In certain implementations, the plurality of chromagram features 116, 200 may be linearly combined to form the primary chromagram features 118 (e.g., according to previously-defined weights). In additional or alternative implementations, the plurality of chromagram features 116, 200 may be combined according to any other conceivable combination strategy. For example, the plurality of chromagram features 116, 200 may be combined by "stacking" the chromagram features 116, 200 (e.g., so that combining two chromagram features 116, 200 with 12 pitch classes forms primary chromagram features with 24 rows). Generating the primary chromagram features 118 based on a plurality of chromagram features 116 may better capture the audio frequency characteristics of the digital audio file 106 (e.g., by separately focusing on different frequency ranges, such as different octaves, within the digital audio file 106). In certain implementations, one or both of blocks 604, 606 may be omitted. For example, in certain implementations, rather than extracting multiple chomagram features and combining them to form the primary chromagram features, a single set of chromagram features may be extracted from the digital audio file 106 and may be used as the primary chromagram features 118.

Dominant pitch classes may be extracted at a plurality of timestamps within the digital audio file (block 608). For example, the computing device 102 may extract dominant pitch classes 120, 300 at a plurality of timestamps 156, 158 within the digital audio file 106. The dominant pitch classes 120, 300 may be extracted from the primary chromagram features 118 using a model, such as a hidden Markov model. In particular, the dominant pitch classes 120, 300 may be extracted as a probability distribution at multiple timestamps T1-19. The timestamps T1-19 may be selected based on the timestamps of the primary chromagram features 118, as explained above.

A plurality of carrier frequencies may be selected for the neural beat (block 610). For example, the computing device 102 may select a plurality of carrier frequencies 114, 400 for the neural beat 168, 174. In particular, the plurality of carrier frequencies 114, 400 may include individual carrier frequencies 160, 162 at multiple timestamps 164, 166, T1-19. The selected carrier frequencies 114, 400 may be selected by a Viterbi process, which may select carrier frequencies such that transitions in carrier frequency at adjacent time periods are optimized according to a transition probability, as explained further herein. In certain implementations, in addition to selecting the plurality of carrier frequencies 114, 400, a particular beat frequency for the neural beat 168 may be selected. For example, where the beat frequency 112 is received as a range of acceptable frequencies, the computing device 102 may select a beat frequency for the neural beat 168 from within the acceptable range, as discussed further below.

A synchronized beat may be synthesized for the digital audio file based on the beat frequency and the plurality of carrier frequencies (block 612). For example, the computing device 102 may synthesize a neural beat 168 for the digital audio file 106 based on the beat frequency 112 and the carrier frequencies 114. In particular, the neural beat 168 may be generated by modulating the beat frequency 112 on two different carrier frequencies 160, 162 at times corresponding to the timestamps 164, 166, T1-19 within the carrier frequencies 114, 400. In this way, the neural beat 168 may be synchronized to the changes of musical harmony and/or melody at different time periods within the digital audio file 106. In certain implementations, the neural beat 168 may be synthesized to contain a single audio channel (e.g., as a monaural beat). In additional or alternative implementations, the neural beat 168 may be synthesized to contain two audio channels (e.g., as a binaural beat with two channels, as a monaural beat with two channels). In still further implementations, the neural beat 168 may be synthesized to contain more than two audio channels (e.g., three audio channels, four audio channels, five audio channels). In certain implementations, the number of audio channels may be specified by a user or a predetermined setting. In additional or alternative implementations, the number of audio channels may be selected based on the number of audio channels in the digital audio file 106 (e.g., such that the neural beat 168 has the same number of audio channels as the digital audio file 106).

At least one of the synchronized neural beat and a combined audio track that combines the synchronized neural beat and the digital audio file may be stored (block 614). For example, the computing device 102 may store at least one of the synchronized neural beat 168 or a combined audio track combining the neural beat 168 with the digital audio file 106. For example, as explained above, the computing device 102 may store the neural beat 168 and/or the combined audio track on the server 104 and/or a local storage within the computing device 102. Additionally or alternatively, the computing device 102 may transmit the neural beat 168 and/or the combined audio track to a user device for storage and playback (e.g., temporary storage for streaming, long-term storage). In implementations where the computing device 102 is a user device, the computing device 102 may store the neural beat 168 and/or the combined audio track locally for current or future playback. In certain implementations, as explained further above, the computing device 102 may be further configured to generate an adjusted neural beat 174 based on the neural be 168. In such instances, the computing device 102 may be configured to store the equalize neural beat 174 and/or a combined audio track that combines the adjusted neural beat 174 with the digital audio file 106 in ways similar to those discussed above.

In this way, the method 600 enables computing devices to generate neural beats for an arbitrary digital audio file, allowing for increased user selection in the types of music that are used to produce neural entrainment. Furthermore, the computing device is able to do so in real time and may ensure that the neural beat blends with the tonal qualities of the digital audio file and/or the loudness of the digital audio file to minimize user distraction and maximize neural entrainment. Accordingly, the method 600 ensures that generated neural beats combine constructively with previously-created digital audio files.

Figure 7A:
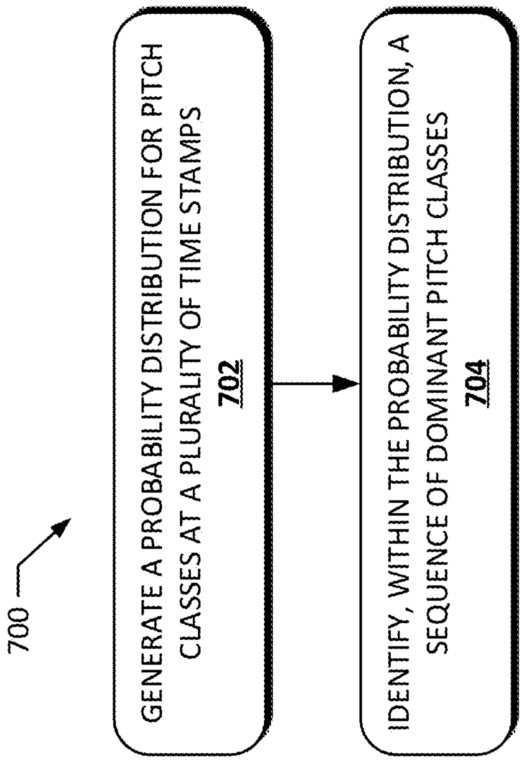
FIGS. 7A-7C illustrate methods according to an exemplary embodiment of the present disclosure.
Figure 7B:
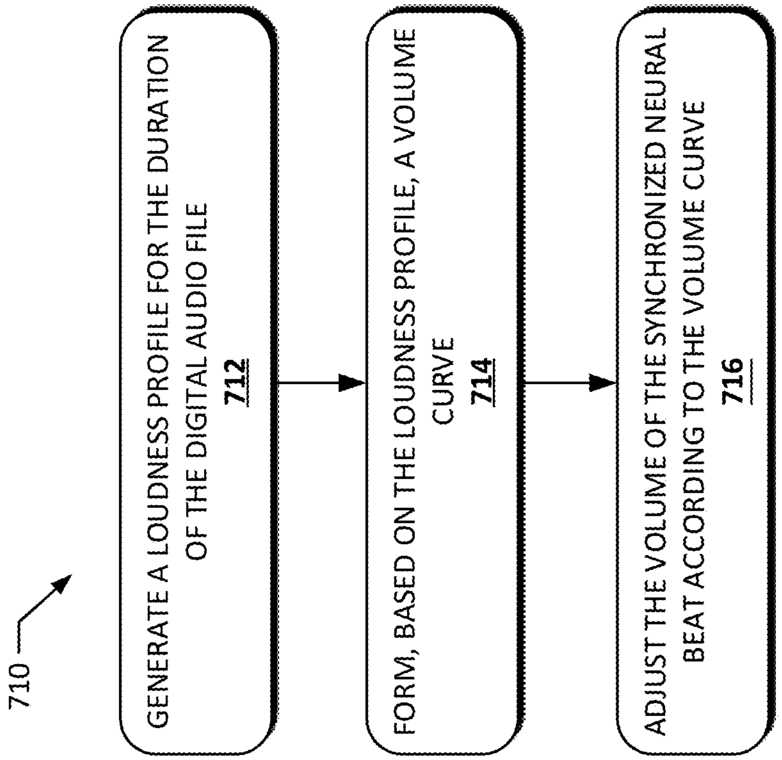
Figure 7C:
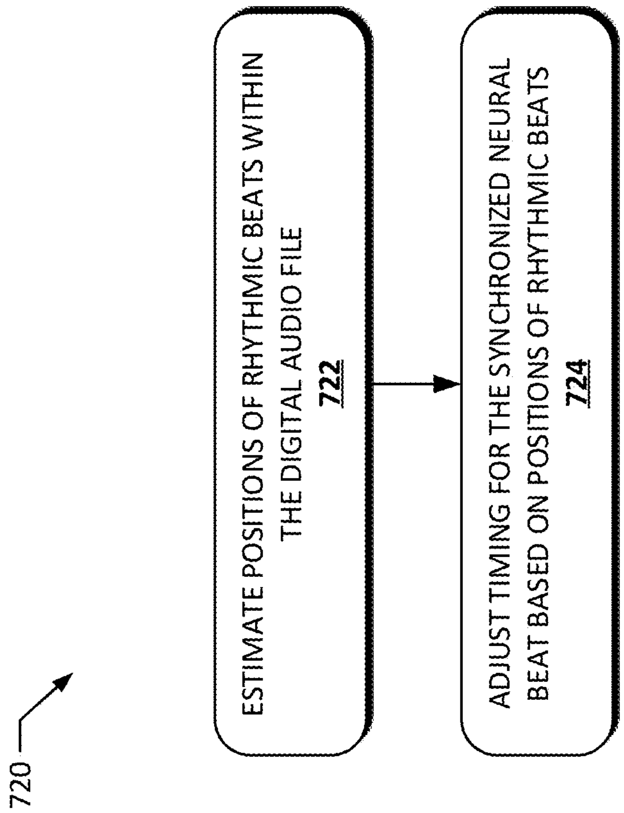

FIGS. 7A-7C illustrate methods 700, 710, 720 according to an exemplary embodiment of the present disclosure. The methods 700, 710, 720 may be performed in combination with at least a portion of the method 600. For example, the method 700 may be performed while implementing blocks 608, 610 of the method 600. As another example, the method 710 may be performed between blocks 612 and 614 and/or part of block 612 of the method 600. As a further example, the method 720 may be performed as part of the block 612 of the method 600. The methods 700, 710, 720 may be implemented on a computer system, such as the systems 100, 190. For example, the methods 700, 710, 720 may be implemented by the computing device 102 and/or the user device 192. The methods 700, 710, 720 may also be implemented by a set of instructions stored on a computer readable medium that, when executed by a processor, cause the computer system to perform the methods 700, 710, 720. For example, all or part of the methods 700, 710, 720 may be implemented by a processor and/or a memory of the computing device 102 and/or the user device 192. Although the examples below are described with reference to the flowchart illustrated in FIGS. 7A-7C, many other methods of performing the acts associated with FIG. 7A-7C may be used. For example, the order of some of the blocks may be changed, certain blocks may be combined with other blocks, one or more of the blocks may be repeated, and some of the blocks described may be optional.

The method 700 may be performed to select the plurality of carrier frequencies for the neural beat. The method 700 may begin generating a probability distribution for pitch classes at a plurality of timestamps (block 702). For example, a hidden Markov model may be used to generate a probability distribution for pitch classes (e.g., B, A sharp/B flat, A, G sharp/A flat, G, F sharp/G flat, F, E, D sharp/E flat, D, C sharp/D flat, and C pitch classes) within the digital audio file 106 at multiple timestamps T1-19 within the digital audio file 106. The timestamps T1-19 may be selected based on timestamps within the primary chromagram features 118 (e.g., based on the segments of the digital audio file 106 used to calculate a time-frequency representation for the chromagram features 116 and/or the primary chromagram features 118). The hidden Markov model may be configured by adjusting a transition probability to select when a transition between different carrier frequencies should occur. In particular, a transition probability (e.g., a transition probability of 0.005-0.02) of the hidden Markov model may have been previously received (or may be updated) based on input received from the user, a system administrator, and/or a computing process.

A sequence of dominant pitch classes may then be identified within the probability distribution (block 704). For example, the computing device 102 may identify a sequence of dominant pitch classes within the probability distribution. In particular, the carrier frequencies 114, 400 may contain a series of dominant pitch classes to be used as carrier frequencies for the neural beat 168. The sequence of dominant pitch classes may be identified to maximize the combined probability of selected pitch classes within the probability distribution according to a constrained transition probability for changes in selected pitch classes. In particular, the sequence of dominant pitch classes may be selected by a Viterbi process implemented by the computing device 102.

In this way, the method 700 may be performed to select a sequence of carrier frequencies based on the musical harmonies and melodies (e.g., chromagram features) of a received digital audio file. Accordingly, this process enables a neural beat 168 to be applied to existing digital audio files while also ensuring that changes in carrier frequency do not disrupt or distract users seeking to trigger neural entrainment using the neural beat.

The method 710 may be performed to adjust the volume of the neural beat 168 based on the volume of the digital audio file 106 at different times within the digital audio file 106. The method 710 may begin with generating a loudness profile for the duration of the digital audio file (block 712). For example, the computing device 102 (e.g., the audio mixer 122) may generate a loudness profile 170 for the duration of the digital audio file 106. The loudness profile 170 may be generated based on an intensity (e.g., audio volume) of the digital audio file 106 at multiple times within the digital audio file 106. For example, the loudness profile 170 may be generated for each data sampling timestamp within the digital audio file 106.

A volume curve may be formed based on the loudness profile (block 714). For example, the computing device 102 may form a volume curve 172 based on the loudness profile 170. The volume curve 172 may be formed as a percentage of the loudness profile 170 (e.g., 50% of the loudness profile 170). Additionally or alternatively, the volume curve 172 may be formed by normalizing the loudness profile 170 for a maximum volume desired for the neural beat 168). One skilled in the art may similarly recognize one or more additional means of generating a volume curve 172 based on a loudness profile 170 for a digital audio file 106. All such similar implementations are hereby considered within the scope of the present disclosure.

The volume of the synchronized neural beats may then be adjusted according to the volume curve (block 716). For example, the computing device 102 may adjust the volume of the neural beat 168 based on the volume curve 172 to generate an adjusted neural beat 174. For example, the neural beat 168 may be scaled in intensity to match the desired volume reflected in the volume curve 172.

In this way, the method 710 may be performed to adjust the neural beat 168. This may reduce the number of intrusive volume mismatches between the neural beat in the digital audio file. For example, where the neural beats is much lower in volume and the digital audio file, a user may not be able to hear the volume of the neural beat, reducing its effectiveness in producing neural entrainment. As another example, where the neural beat is much higher in volume than the digital audio file 106, a user may be distracted or disrupted by the difference in volume, interrupting or reducing any neural entrainment produced by the neural beat.

The method 720 may be used to synchronize the neural beat 168 with the rhythmic patterns in the digital audio file 106. The method 720 may begin with estimating positions of rhythmic beats within the digital audio file (block 722). For example, the computing device 102 may estimate positions of rhythmic beats within the digital audio file 106. Positions for the rhythmic beats within the digital audio file 106 may be estimated using a machine learning model, such as a pre-trained network configured to detect rhythmic beats within audio files. For example, positions of the rhythmic beats may be estimated using one or more models analogous to those offered by the madmom audio software package, the Essentia audio software package, and the like. In additional or alternative implementations, positions for the rhythmic beats may be estimated using one or more algorithmic techniques.

Timing for the synchronized neural beat may be adjusted based on positions of the rhythmic beats within the digital audio file (box 724). For example, the computing device 102 may adjust timing for the neural beat 168 based on the positions of the rhythmic beats. For example, the computing device 102 may adjust the beat frequency 112 to align with (e.g., to be a multiple of) the tempo of the digital audio file. For example, where the digital audio file 106 has a tempo of 120 bpm and the beat frequency 112 is 0.6 Hz (e.g., 100 bpm), the computing device 102 may adjust the beat frequency 112 to be an integer multiple of the 120 beats per minute (e.g., 2 Hz) tempo. As a specific example, the computing device 102 may adjust the beat frequency 112 to be 0.5 Hz (30 bpm) and/or 1 Hz (60 bpm). In implementations where a user has specified a desired frequency range for the beat frequency 112, the beat frequency 112 may be selected from within the desired frequency range to be an even multiple of the rhythmic frequency and/or as close as possible to a multiple of the rhythmic frequency. In addition, the timing for the synchronized neural beat may be adjusted such that peak values in the neural beat (e.g., peak values at the beat frequency 112) occur at the same time as (e.g., align with the timing of) rhythmic beats within the digital audio file 106.

In this way, the method 720 may be used to ensure that the rhythmic beats within the digital audio file and the beat frequency are not out of phase. In particular, when a beat frequency is out of phase with the rhythmic frequency of a digital audio file, interferences between the beat frequency in the digital audio file may negatively impact the sound quality and/or may create distracting or disruptive interference patterns when the digital audio file and a neural beat at the interfering beat frequency are played at the same time. Accordingly, adjusting the beat frequency based on the rhythmic beats within the digital audio file may reduce these interferences, improving the quality of the subsequently-generated neural beat and/or the quality of neural entrainment produced by the neural beat.

Figure 8:
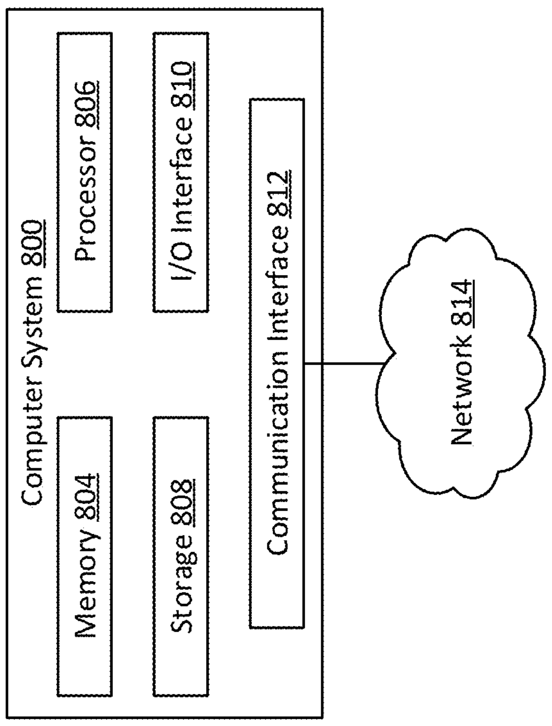
FIG. 8 illustrates a computing system according to an exemplary embodiment of the present disclosure.

FIG. 8 illustrates an example computer system 800 that may be utilized to implement one or more of the devices and/or components discussed herein, such as the computing device 102. In particular embodiments, one or more computer systems 800 perform one or more steps of one or more methods described or illustrated herein. In particular embodiments, one or more computer systems 800 provide the functionalities described or illustrated herein. In particular embodiments, software running on one or more computer systems 800 performs one or more steps of one or more methods described or illustrated herein or provides the functionalities described or illustrated herein. Particular embodiments include one or more portions of one or more computer systems 800. Herein, a reference to a computer system may encompass a computing device, and vice versa, where appropriate. Moreover, a reference to a computer system may encompass one or more computer systems, where appropriate.

This disclosure contemplates any suitable number of computer systems 800. This disclosure contemplates the computer system 800 taking any suitable physical form. As example and not by way of limitation, the computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, the computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 806, memory 804, storage 808, an input/output (I/O) interface 810, and a communication interface 812. Although this disclosure describes and illustrates a particular computer system having a particular number of particular components in a particular arrangement, this disclosure contemplates any suitable computer system having any suitable number of any suitable components in any suitable arrangement.

In particular embodiments, the processor 806 includes hardware for executing instructions, such as those making up a computer program. As an example and not by way of limitation, to execute instructions, the processor 806 may retrieve (or fetch) the instructions from an internal register, an internal cache, memory 804, or storage 808; decode and execute the instructions; and then write one or more results to an internal register, internal cache, memory 804, or storage 808. In particular embodiments, the processor 806 may include one or more internal caches for data, instructions, or addresses. This disclosure contemplates the processor 806 including any suitable number of any suitable internal caches, where appropriate. As an example and not by way of limitation, the processor 806 may include one or more instruction caches, one or more data caches, and one or more translation lookaside buffers (TLBs). Instructions in the instruction caches may be copies of instructions in memory 804 or storage 808, and the instruction caches may speed up retrieval of those instructions by the processor 806. Data in the data caches may be copies of data in memory 804 or storage 808 that are to be operated on by computer instructions; the results of previous instructions executed by the processor 806 that are accessible to subsequent instructions or for writing to memory 804 or storage 808; or any other suitable data. The data caches may speed up read or write operations by the processor 806. The TLBs may speed up virtual-address translation for the processor 806. In particular embodiments, processor 806 may include one or more internal registers for data, instructions, or addresses. This disclosure contemplates the processor 806 including any suitable number of any suitable internal registers, where appropriate. Where appropriate, the processor 806 may include one or more arithmetic logic units (ALUs), be a multi-core processor, or include one or more processors 806. Although this disclosure describes and illustrates a particular processor, this disclosure contemplates any suitable processor.

In particular embodiments, the memory 804 includes main memory for storing instructions for the processor 806 to execute or data for processor 806 to operate on. As an example, and not by way of limitation, computer system 800 may load instructions from storage 808 or another source (such as another computer system 800) to the memory 804. The processor 806 may then load the instructions from the memory 804 to an internal register or internal cache. To execute the instructions, the processor 806 may retrieve the instructions from the internal register or internal cache and decode them. During or after execution of the instructions, the processor 806 may write one or more results (which may be intermediate or final results) to the internal register or internal cache. The processor 806 may then write one or more of those results to the memory 804. In particular embodiments, the processor 806 executes only instructions in one or more internal registers or internal caches or in memory 804 (as opposed to storage 808 or elsewhere) and operates only on data in one or more internal registers or internal caches or in memory 804 (as opposed to storage 808 or elsewhere). One or more memory buses (which may each include an address bus and a data bus) may couple the processor 806 to the memory 804. The bus may include one or more memory buses, as described in further detail below. In particular embodiments, one or more memory management units (MMUs) reside between the processor 806 and memory 804 and facilitate accesses to the memory 804 requested by the processor 806. In particular embodiments, the memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory implementations, this disclosure contemplates any suitable memory implementation.

In particular embodiments, the storage 808 includes mass storage for data or instructions. As an example and not by way of limitation, the storage 808 may include a hard disk drive (HDD), a floppy disk drive, flash memory, an optical disc, a magneto-optical disc, magnetic tape, or a Universal Serial Bus (USB) drive or a combination of two or more of these. The storage 808 may include removable or non-removable (or fixed) media, where appropriate. The storage 808 may be internal or external to computer system 800, where appropriate. In particular embodiments, the storage 808 is non-volatile, solid-state memory. In particular embodiments, the storage 808 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 808 taking any suitable physical form. The storage 808 may include one or more storage control units facilitating communication between processor 806 and storage 808, where appropriate. Where appropriate, the storage 808 may include one or more storages 808. Although this disclosure describes and illustrates particular storage, this disclosure contemplates any suitable storage.

In particular embodiments, the I/O Interface 810 includes hardware, software, or both, providing one or more interfaces for communication between computer system 800 and one or more I/O devices. The computer system 800 may include one or more of these I/O devices, where appropriate. One or more of these I/O devices may enable communication between a person (i.e., a user) and computer system 800. As an example and not by way of limitation, an I/O device may include a keyboard, keypad, microphone, monitor, screen, display panel, mouse, printer, scanner, speaker, still camera, stylus, tablet, touch screen, trackball, video camera, another suitable I/O device or a combination of two or more of these. An I/O device may include one or more sensors. Where appropriate, the I/O Interface 810 may include one or more device or software drivers enabling processor 806 to drive one or more of these I/O devices. The I/O interface 810 may include one or more I/O interfaces 810, where appropriate. Although this disclosure describes and illustrates a particular I/O interface, this disclosure contemplates any suitable I/O interface or combination of I/O interfaces.

In particular embodiments, communication interface 812 includes hardware, software, or both providing one or more interfaces for communication (such as, for example, packet-based communication) between computer system 800 and one or more other computer systems 800 or one or more networks 814. As an example and not by way of limitation, communication interface 812 may include a network interface controller (NIC) or network adapter for communicating with an Ethernet or any other wire-based network or a wireless NIC (WNIC) or wireless adapter for communicating with a wireless network, such as a Wi-Fi network. This disclosure contemplates any suitable network 814 and any suitable communication interface 812 for the network 814. As an example and not by way of limitation, the network 814 may include one or more of an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a Bluetooth® WPAN), a Wi-Fi network, a WI-MAX network, a cellular telephone network (such as, for example, a Global System for Mobile Communications (GSM) network), or any other suitable wireless network or a combination of two or more of these. Computer system 800 may include any suitable communication interface 812 for any of these networks, where appropriate. Communication interface 812 may include one or more communication interfaces 812, where appropriate. Although this disclosure describes and illustrates a particular communication interface implementations, this disclosure contemplates any suitable communication interface implementation.

The computer system 802 may also include a bus. The bus may include hardware, software, or both and may communicatively couple the components of the computer system 800 to each other. As an example and not by way of limitation, the bus may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-PIN-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these buses. The bus may include one or more buses, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (e.g., field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:

receiving at a server or a user device a digital audio file and a beat frequency for a neural beat to be added to the digital audio file;

extracting a plurality of chromagram features of the digital audio file according to a plurality of parameters;

combining the plurality of chromagram features to form primary chromagram features of the digital audio file;

extracting, from the primary chromagram features, dominant pitch classes at a plurality of timestamps within the digital audio file;

selecting, based on the dominant pitch classes at the plurality of timestamps, a plurality of carrier frequencies for the neural beat;

synthesizing, based on the beat frequency and the plurality of carrier frequencies, a synchronized neural beat for the digital audio file;

storing at the server or the user device at least one of (i) the synchronized neural beat and (ii) a combined audio track combining the synchronized neural beat and the digital audio file; and causing an audio output device to (i) play the combined audio track or (ii) play the synchronized neural beat in parallel with digital audio file.

2. The method of claim 1, wherein the primary chromagram features include an intensity for each of a plurality of pitch classes at the plurality of timestamps, and wherein the dominant pitch classes are selected from among the plurality of pitch classes.

3. The method of claim 2, wherein extracting the dominant pitch classes further comprises generating, with a hidden Markov model, a probability distribution for each of the plurality of pitch classes at the plurality of timestamps based on the intensity of the plurality of pitch classes.

4. The method of claim 3, wherein the hidden Markov model is configured to optimize the number and positions of transitions between dominant pitch classes.

5. The method of claim 3, wherein extracting the dominant pitch classes further comprises identifying, within the probability distribution, a sequence of dominant pitch classes.

6. The method of claim 1, wherein the plurality of timestamps occur every 500 milliseconds or less during the digital audio file.

7. The method of claim 1, wherein the plurality of chromagram features are linearly combined to form the primary chromagram features.

8. The method of claim 1, further comprising adjusting a volume of the synchronized neural beat to follow a volume of the digital audio file over time.

9. The method of claim 8, wherein normalizing the volume of the synchronized neural beat comprises:

generating a loudness profile for a duration of the digital audio file;

forming, based on the loudness profile, a volume curve; and adjusting the volume of the synchronized neural beat according to the volume curve.

10. The method of claim 1, further comprising aligning the beat frequency with a rhythmic beat within the digital audio file.

11. The method of claim 10, wherein aligning the beat frequency comprises:

estimating positions of rhythmic beats within the digital audio file;

estimating the musical tempo within the digital audio file; and adjusting timing for the synchronized neural beat to align peak values within the synchronized neural beat with the positions of rhythmic beats within the digital audio file according to the musical tempo.

12. The method of claim 1, wherein the neural beat is at least one of (i) a binaural beat and (ii) a monaural beat.

13. The method of claim 1, wherein the synchronized neural beat includes two or fewer audio channels.

14. The method of claim 1, wherein the synchronized neural beat includes three or more audio channels.

15. The method of claim 1, wherein the beat frequency is greater than or equal to 0.5 Hz and less than or equal to 150 Hz.

16. The method of claim 1, further comprising playing, via a computing device, the synchronized neural beat and the digital audio file in parallel.

17. The method of claim 16, further comprising streaming, to the computing device, the synchronized neural beat and the digital audio file for playback by the computing device.

18. A system comprising:

a processor; and a memory storing instructions which, when executed by the processor, cause the processor to:

receive a digital audio file and a beat frequency for a neural beat to be added to the digital audio file;

extract a plurality of chromagram features of the digital audio file according to a plurality of parameters;

combine the plurality of chromagram features to form primary chromagram features of the digital audio file;

extract, from the primary chromagram features, dominant pitch classes at a plurality of timestamps within the digital audio file;

select, based on the dominant pitch classes at the plurality of timestamps, a plurality of carrier frequencies for the neural beat;

synthesize, based on the beat frequency and the plurality of carrier frequencies, a synchronized neural beat for the digital audio file;

store in the memory at least one of (i) the synchronized neural beat and (ii) a combined audio track combining the synchronized neural beat and the digital audio file; and cause an audio output device to (i) play the combined audio track or (ii) play the synchronized neural beat in parallel with digital audio file.

19. The system of claim 18, wherein the primary chromagram features include an intensity for each of a plurality of pitch classes at the plurality of timestamps, and wherein the dominant pitch classes are selected from among the plurality of pitch classes.

20. The system of claim 19, wherein the memory stores further instructions which, when executed by the processor while extracting the dominant pitch classes, cause the processor to generate, with a hidden Markov model, a probability distribution for each of the plurality of pitch classes at the plurality of timestamps based on the intensity of the plurality of pitch classes.

21. A method, comprising:

receiving at a server a digital audio file and a beat frequency for a neural beat to be added to the digital audio file;

extracting a plurality of chromagram features of the digital audio file according to a plurality of parameters;

combining the plurality of chromagram features to form primary chromagram features of the digital audio file;

extracting, from the primary chromagram features, dominant pitch classes at a plurality of timestamps within the digital audio file;

selecting, based on the dominant pitch classes at the plurality of timestamps, a plurality of carrier frequencies for the neural beat;

synthesizing, based on the beat frequency and the plurality of carrier frequencies, a synchronized neural beat for the digital audio file;

creating a combined audio track combining the synchronized neural beat and the digital audio file; and sending the combined audio track combining the synchronized neural beat and the digital audio file to a user device.

* * * * *